(12) United States Patent
Wakeford et al.

(10) Patent No.: US 9,440,143 B2
(45) Date of Patent: Sep. 13, 2016

(54) SYSTEM AND METHOD FOR DETERMINING IN-GAME CAPABILITIES BASED ON DEVICE INFORMATION

(71) Applicant: KABAM, INC., San Francisco, CA (US)

(72) Inventors: Kent Wakeford, Hillsborough, CA (US); Clifford J. Harrington, San Francisco, CA (US)

(73) Assignee: KABAM, INC., San Francisco, CA (US)

( * ) Notice: Subject to any disclaimer, the term of this patent is extended or adjusted under 35 U.S.C. 154(b) by 190 days.

(21) Appl. No.: 13/934,047

(22) Filed: Jul. 2, 2013

(65) Prior Publication Data

US 2015/0011277 A1 Jan. 8, 2015

(51) Int. Cl.
*A63F 13/00* (2014.01)

(52) U.S. Cl.
CPC .................................... *A63F 13/00* (2013.01)

(58) Field of Classification Search
CPC ......... G06F 15/00; A63F 13/10; A63F 13/12
See application file for complete search history.

(56) References Cited

U.S. PATENT DOCUMENTS

| | | | |
|---|---|---|---|
| 5,838,907 A | 11/1998 | Hansen | 395/200.5 |
| 6,425,822 B1 | 7/2002 | Hayashida | |
| 7,465,231 B2 | 12/2008 | Lewin et al. | 463/37 |
| 7,568,973 B2 | 8/2009 | Iddings | |
| 7,890,586 B1 | 2/2011 | McNamara | |
| 7,930,215 B2 | 4/2011 | Pombo et al. | 705/26 |
| 7,997,987 B2 | 8/2011 | Johnson et al. | 463/42 |
| 8,016,678 B1 | 9/2011 | Hutter et al. | 463/42 |
| 8,126,426 B2 | 2/2012 | Fridman | |
| 8,209,277 B2 | 6/2012 | Kumar et al. | 706/46 |
| 8,292,725 B2 | 10/2012 | Wikander | |
| 8,360,873 B1 | 1/2013 | Wickett | |
| 8,401,009 B1 | 3/2013 | Dorsey et al. | 370/389 |
| 8,423,889 B1 | 4/2013 | Zagrie et al. | 715/255 |
| 2002/0112081 A1 | 8/2002 | Armstrong | |
| 2002/0132608 A1 | 9/2002 | Shinohara | 455/412 |
| 2002/0138582 A1 | 9/2002 | Chandra | |
| 2002/0158917 A1 | 10/2002 | Sinclair et al. | 345/850 |
| 2003/0172121 A1 | 9/2003 | Evans et al. | 709/206 |
| 2005/0261062 A1 | 11/2005 | Lewin | |

(Continued)

FOREIGN PATENT DOCUMENTS

| | | |
|---|---|---|
| WO | WO 2006/013429 | 2/2006 |
| WO | WO 2008/157477 | 12/2008 |

(Continued)

*Primary Examiner* — Paul A D'Agostino
*Assistant Examiner* — Ankit Doshi
(74) *Attorney, Agent, or Firm* — Sheppard Mullin Richter & Hampton LLP

(57) ABSTRACT

A virtual space is provided to users via client computing devices. Device information related to a client computing platform used by a user to interact with the virtual space may be obtained. Customized in-game capabilities available for the user may be determined based on the device information, which may include a description of or otherwise identify the client computing platform. The device information may include or otherwise by used to obtain device capabilities such as hardware, software, network, and/or other specifications. Different users using different client computing platforms may be provided with different in-game capabilities such as user roles, content items, levels, and/or other content or actions available for the user in the virtual space based on the client computing platform used by the users to interact with the virtual space.

20 Claims, 8 Drawing Sheets

(56) References Cited

U.S. PATENT DOCUMENTS

| | | |
|---|---|---|
| 2006/0015580 A1 | 1/2006 | Gabriel et al. ............... 709/219 |
| 2006/0136964 A1 | 6/2006 | Diez et al. ..................... 725/37 |
| 2007/0011256 A1 | 1/2007 | Klein |
| 2007/0219000 A1 | 9/2007 | Aida |
| 2008/0090659 A1 | 4/2008 | Aguilar |
| 2008/0176618 A1 | 7/2008 | Toompere |
| 2008/0207327 A1 | 8/2008 | Van Luchene |
| 2008/0228636 A1 | 9/2008 | Gattis |
| 2009/0077463 A1* | 3/2009 | Koster ......................... 715/234 |
| 2009/0170608 A1 | 7/2009 | Herrmann |
| 2010/0245912 A1 | 9/2010 | Mount et al. ................ 358/1.15 |
| 2010/0248822 A1 | 9/2010 | Migos |
| 2011/0022641 A1 | 1/2011 | Werth et al. .................. 707/803 |
| 2011/0082703 A1 | 4/2011 | Higbie .......................... 705/1.1 |
| 2011/0118028 A1 | 5/2011 | Sobel |
| 2011/0145050 A1 | 6/2011 | Gross |
| 2011/0179180 A1 | 7/2011 | Schleifer |
| 2011/0237335 A1 | 9/2011 | Holloway |
| 2011/0250972 A1 | 10/2011 | Horbay |
| 2011/0276883 A1 | 11/2011 | Cabble |
| 2012/0007569 A1 | 1/2012 | Sumimoto |
| 2012/0011211 A1 | 1/2012 | Smith |
| 2012/0038550 A1 | 2/2012 | Lemmey et al. ............. 345/156 |
| 2012/0192087 A1 | 7/2012 | Lemmey |
| 2012/0252582 A1 | 10/2012 | Hilleman ....................... 463/43 |
| 2012/0265568 A1 | 10/2012 | Marshall |
| 2012/0277003 A1 | 11/2012 | Eliovits et al. ................ 463/42 |
| 2012/0311041 A1 | 12/2012 | Aonuma |
| 2012/0331058 A1 | 12/2012 | Huston et al. ................ 709/204 |
| 2013/0085886 A1 | 4/2013 | Satish et al. ................. 705/26.7 |
| 2013/0086467 A1 | 4/2013 | Weber et al. ................. 715/239 |
| 2013/0109480 A1 | 5/2013 | Yuan .............................. 463/42 |
| 2013/0117105 A1 | 5/2013 | Dyor et al. ................. 705/14.52 |
| 2013/0117377 A1 | 5/2013 | Miller ........................... 709/205 |
| 2013/0125113 A1 | 5/2013 | Do |
| 2013/0310156 A1 | 11/2013 | Gadher |
| 2014/0040760 A1 | 2/2014 | Randell |
| 2014/0194208 A1 | 7/2014 | Splaine |
| 2014/0310036 A1 | 10/2014 | Grosso |
| 2014/0324965 A1 | 10/2014 | Ralston |
| 2015/0120408 A1 | 4/2015 | Liu |

FOREIGN PATENT DOCUMENTS

| | | |
|---|---|---|
| WO | WO 2013/123122 | 8/2013 |
| WO | WO 2015/003069 | 1/2015 |

\* cited by examiner

SYSTEM AND METHOD FOR DETERMINING IN-GAME CAPABILITIES BASED ON DEVICE INFORMATION

FIELD OF THE DISCLOSURE

This disclosure relates to systems and methods for obtaining device information of a client computing platform used by a user to interact with a virtual space of a game and determining and providing customized in-game capabilities available for the user based on the device information.

BACKGROUND

Different classes of devices such as laptop computers, tablet computers, gaming consoles, smartphones, and/or other classes of devices may have technical capabilities that are different from one another. For example, laptop computers may have different technical capabilities than smartphones. Furthermore, different types of devices within a given class of device may have different capabilities from one another. For example, a particular model of smartphone may have different technical capabilities than another model of smartphone. Leveraging these differences for gameplay of a game may provide dynamic gaming experiences for users depending on the class and/or type of device used to access the game.

SUMMARY

One aspect of the disclosure relates to obtaining device information of a client computing platform used by a user to interact with a virtual space of a game and determining and providing customized in-game capabilities available for the user based on the device information. The device information may indicate a class (e.g., a laptop computer, a console device, a mobile device, etc.), a type (e.g., particular brand, model, version, etc.), and/or other description of the client computing platform. The device information may include or otherwise by used to obtain device capabilities such as hardware, software, network, and/or other capabilities.

The client computing platform used to interact with the virtual space of the game may be automatically determined. For example, for online game implementations accessed through a client browser, header information from HTTP requests may be used to determine a class and/or type of device being used to access the game. The class and/or type of client computing platform used to access the game may also be determined based on an indication from the device. For example, the class and/or type of device information may be included as part of a logon operation to join gameplay. In some instances, the class and/or type information may be stored in a user profile such that the user provides the particular classes and/or types of devices used to access the game. Upon selection of a class during a logon process, for example, the type of device may be determined based on the user profile information.

Regardless of how the client computing platform being used to interact with the virtual space of the game is determined, different in-game capabilities may be assigned to the user based on the identification. An in-game capability may include content and/or actions that can be imparted to the user such that the user may access the in-game capability while interacting with the virtual space. For example, in-game capabilities may include a user role that the user may play such as in a team play environment, in-game content items available for use during gameplay, a level or scene available for traversal by the user, and/or other in-game capabilities. In a particular example, a user accessing the game via a laptop computer may be assigned to be a front line battle player while a user accessing the game through a smartphone may be assigned to be a healer or be another support role. In this manner, a user may contribute to and be immersed in gameplay even while accessing the game through a more limited class and/or type of device.

Users may switch devices (e.g., client computing platforms) during gameplay (e.g., from a smartphone to laptop or vice versa). In these instances, the gameplay capabilities may be dynamically altered based on updated device information.

Users may be classified into user classes based on the determined class and/or type device. Each user class may be assigned with one or more different in-game capabilities (such as user roles) such that users in a given user class may be assigned with one or more different gameplay capabilities. For example, one user class may be assigned with gameplay capabilities that are different from the capabilities assigned to another class of user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
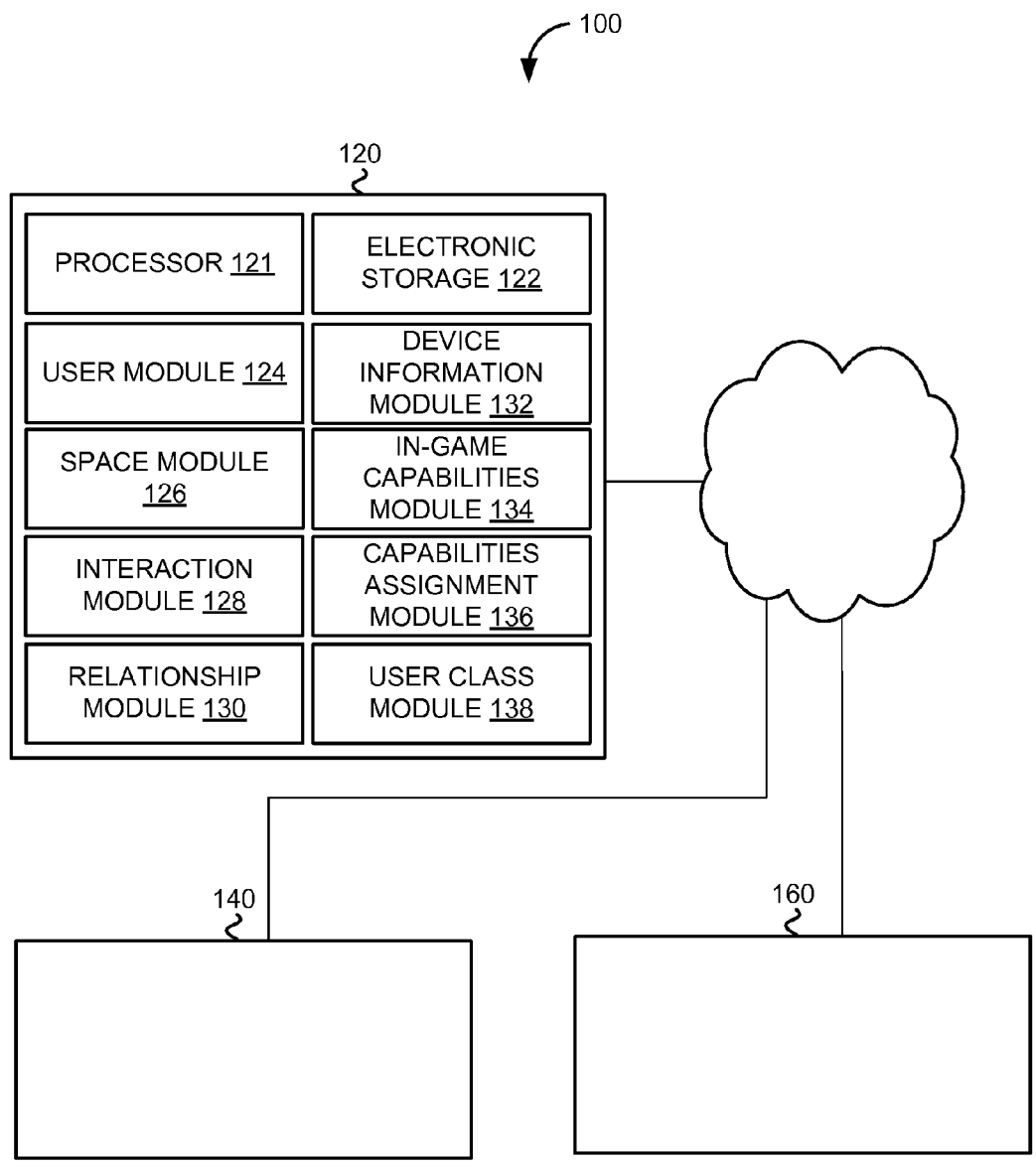
FIG. 1 illustrates a system configured to provide a virtual space to users, according to an aspect of the invention.

FIG. 1 illustrates a system 100 configured to provide a virtual space to users, according to an aspect of the invention. Providing the virtual space may include hosting the virtual space over a network. In some implementations, system 100 may include a server 120. The server 120 may be configured to communicate with one or more client computing platforms 140 according to a client/server architecture. The users may access system 100 and/or the virtual space via client computing platforms 140.

The server 120 may be configured to execute one or more computer program modules. The computer program modules may include one or more of a user module 124, a space module 126, an interaction module 128, a relationship module 130, device information module 28, a game capabilities module 30, a capabilities assignment module 32, a user class module 34, and/or other modules.

The user module 124 may be configured to access and/or manage one or more user profiles and/or user information associated with users of the system 100. The one or more user profiles and/or user information may include information stored by server 120, one or more of the client computing platforms 140, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, device information for each client computing platform used by the user to interact with the virtual space, a phone number associated with a user, and/or other information related to users.

The space module 126 may be configured to implement the instance of the virtual space executed by the computer modules to determine state of the virtual space. The state may then be communicated (e.g., via streaming visual data, via object/position data, and/or other state information) from server 120 to client computing platforms 140 for presentation to users. The state determined and transmitted to a given client computing platform 140 may correspond to a view for a user character being controlled by a user via the given client computing platform 140. The state determined and transmitted to a given client computing platform 140 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 140) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by space module 126 is not intended to be limiting. The space module 126 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 126, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 140. The users may interact with each other through communications exchanged within the virtual space. Such communications may include one or more of textual chat, instant messages, private messages, voice communications, and/or other communications. Communications may be received and entered by the users via their respective client computing platforms 140. Communications may be routed to and from the appropriate users through server 120 (e.g., through space module 126).

The interaction module 128 may be configured to monitor interactions of the users with the virtual space and/or each other within the virtual space. This may include monitoring, for a given user, one or more times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module 128 in monitoring the interactions of the users may be stored to the user profiles managed by user module 124.

At a given time, interaction module 128 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module 128 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

The relationship module 130 may be configured to establish relationships between users within the virtual space. Such relationships may include one or more of friendships, guilds (with guild-mates), alliances, connections, followers, and/or other relationships. The relationship module 130 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual space, and/or one or more types of relationships that a social construct within the virtual space that does not have a functional result.

The device information module 132 may be configured to obtain device information and identify a device such as a client computing platform 140 used to interact with the virtual space based on the device information. The device information may include information that indicates a general class of device, a particular type of device, and/or other granularity of device identifying information. For example, the class of device may include general descriptions of devices such as information indicating that the device is a desktop computing device, a laptop computing device, a tablet device, a mobile device (e.g., smart phone), and/or other general description. The type of device may include a particular brand, model, operating system, and/or other description that more specifically identifies the client computing platform 140 used to interact with the virtual space.

The device information module 132 may passively obtain the device information based on communications with client computing platform 140 such as by reading headers or other portions of communications from client computing platform to identify the device being used to interact with the virtual space. For example, the device information module 132 may read Hypertext Transfer Protocol ("HTTP") headers to determine a browser used to interact with the virtual space and accordingly identify the device that operates the browser. Agents used to interact with the virtual space other than a browser may be operating on client computing platform 140. Such agents may encode the device information and provide to server 120 the device information.

The device information module 132 may actively obtain the device information such as by querying or otherwise causing the client computing platform 140 to provide the device information. For example, device information module 132 and/or an agent operating on the client computing platform 140 may cause a prompt for the device information to be input by the user.

The device information module 132 may determine when a given user changes the device used to interact with the virtual space. For example, a user may switch from using a laptop device to using a mobile device to interact with the virtual space. The device information module 132 may detect the change and accordingly associate the new device information with the user.

The in-game capabilities module 134 may be configured to determine in-game capabilities based on the device information. In-game capabilities may include, for example, a user role that the user may play (e.g., a front-line battle role, a healer role, a support role, etc.), in-game content that is available for use in the virtual space, a game level or scene available in the virtual space, and/or other capabilities related to the virtual space that may be made available to the user.

The in-game capabilities module 134 may determine custom in-game capabilities for the user by comparing device requirements of in-game capabilities with abilities of a given device based on corresponding device information and/or consulting pre-stored in-game capabilities that are available for the given device.

In some embodiments, for example, the in-game capabilities module 134 may determine custom in-game capabilities for the user based on one or more device requirements for one or more in-game capabilities. Different in-game capabilities may be associated with different device requirements. For example, a given in-game capability may involve initiating a processor-intensive game event such as a virtual battle that requires (or otherwise would be optimal with) a particular processing ability, relate to providing rich visual displays that require (or otherwise would be optimal with) a particular screen resolution, and/or relate to requiring (or otherwise would be optimal with) other abilities of the client computing device 140 in order to appropriately render or process the game event.

The in-game capabilities module 134 may obtain the device information for a given device being by the user to interact with the virtual space and compare the device information with the device requirements in order to identify in-game capabilities for which the device satisfies the device requirements. For example, if a given in-game capability requires or would be more optimal with a minimum processor speed, then in-game capabilities module 134 may determine that the user of a device that meets or exceeds that minimum processor speed qualifies for the given in-game capability. The in-game capabilities module 134 may perform this analysis for each of the in-game capabilities. In some embodiments, the in-game capabilities module 134 may perform this analysis on more than one device requirement. For example, the given in-game capability may require or be more optimal with both a minimum processor speed and a minimum screen resolution.

In some embodiments, the in-game capabilities module 134 may determine custom in-game capabilities for the user based on an association of a given device with corresponding in-game capabilities that are available for the device. For example, in-game capabilities module 134 may identify a given client computing platform 140 used to interact with the virtual space and obtain in-game capabilities that are available for the device.

Whichever method of determining in-game capabilities is used, the in-game capabilities module 134 may determine the in-game capabilities in real-time or near real-time such that changes in the device used by a user to interact with the virtual space may be accounted for. As such, in-game capabilities available to the user may be updated depending on the device the user is currently using. For example, when the user switches from a console device to a mobile device to interact with the virtual space, in-game capabilities module 134 may update the custom in-game capabilities that are made available to the user.

The capabilities assignment module 136 may be configured to assign a given in game capability to the user from among in-game capabilities that are available for the user. For example, the capabilities assignment module 136 may assign an in-game capability to the user based on previous gameplay, indications by the user, manual assignments from one user (e.g., a team leader of a team of players), and/or other factors by which assignments of in-game capabilities may be made.

Previous gameplay may indicate a given user's propensity or desire to have or otherwise use a given in-game capability. For example, the given user may prefer to play as a front-line battler rather than a support role. Thus, whenever the user accesses the virtual space using a device for which the front-line battler role capability is available, the capabilities assignment module 136 may assign that role to the user. Likewise, indications by the user such as a profile setting, option setting, or other indication from the user that indicates a preference for particular in-game capabilities may be used to assign in-game capabilities to the user.

In some embodiments, the capabilities assignment module 136 may assign a given in-game capability for the user based on input from another user such as a team leader of a team (e.g., explicit or implicit group of players playing together in common or otherwise coordinated with one another). The team leader may thus assign a given in-game capability to the user based on a role or other capability that the team leader would like the user to fill. In some embodiments, only available in-game capabilities for a given user may be presented for selection to the other user (e.g., the team leader). In some embodiments, all in-game capabilities may be presented for selection by the other user and post-selection verification may be performed to ensure that the given user is not assigned with an in-game capability that is not available for the given user (e.g., the team leader may not be allowed to assign a front line battler role to a user who is using a device that does not support or otherwise does not meet the requirements of that role).

The user class module 138 may be configured to determine user classes. A user class may include one or more users that use similar or identical devices to interact with the virtual space. As such, a given user class may include users that have at least some in-game capabilities in common that are available to each user. Such user classes may include, for illustrative purposes only, "console users," "laptop users," "mobile device users," and/or other classes of users, which may be defined by the device information of a device used by users of the user class to interact with the virtual space. User classes may help to facilitate assignment of in-game capabilities to other users (e.g., who may be a member of a team of users), invite users to form a team, or otherwise classify users based on the device they use to interact with the virtual space.

In some implementations, the server 120, client computing platforms 140, and/or external resources 160 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 120, client computing platforms 140, and/or external resources 160 may be operatively linked via some other communication media.

A given client computing platform 140 may include one or more processors configured to execute computer program modules. The computer program modules may be configured to enable an expert or user associated with the given client computing platform 140 to interface with system 100 and/or external resources 160, and/or provide other functionality attributed herein to client computing platforms 140. By way of non-limiting example, the given client computing platform 140 may include one or more of a desktop computer, a laptop computer, a handheld computer, a tablet computing platform, a NetBook, a Smartphone, a gaming console, and/or other computing platforms.

The external resources 160 may include sources of information, hosts and/or providers of virtual environments outside of system 100, external entities participating with system 100, and/or other resources. In some implementations, some or all of the functionality attributed herein to external resources 160 may be provided by resources included in system 100.

The server 120 may include electronic storage 122, one or more processors 40, and/or other components. The server 120 may include communication lines, or ports to enable the exchange of information with a network and/or other computing platforms. Illustration of server 120 in FIG. 1 is not intended to be limiting. The server 120 may include a plurality of hardware, software, and/or firmware components operating together to provide the functionality attributed herein to server 120. For example, server 120 may be implemented by a cloud of computing platforms operating together as server 120.

Electronic storage 122 may comprise electronic storage media that electronically stores information. The electronic storage media of electronic storage 122 may include one or both of system storage that is provided integrally (i.e., substantially non-removable) with server 120 and/or removable storage that is removably connectable to server 120 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor 121, information received from server 120, information received from client computing platforms 140, and/or other information that enables server 120 to function as described herein.

Processor(s) 40 is configured to provide information processing capabilities in server 120. As such, processor 121 may include one or more of a digital processor, an analog processor, a digital circuit designed to process information, an analog circuit designed to process information, a state machine, and/or other mechanisms for electronically processing information. Although processor 121 is shown in FIG. 1 as a single entity, this is for illustrative purposes only. In some implementations, processor 121 may include a plurality of processing units. These processing units may be physically located within the same device, or processor 121 may represent processing functionality of a plurality of devices operating in coordination. The processor 121 may be configured to execute modules 124, 126, 128, 130, 132, 134, 136, and 138. Processor 121 may be configured to execute modules 124, 126, 128, 130, 132, 134, 136, and 138 by software; hardware; firmware; some combination of software, hardware, and/or firmware; and/or other mechanisms for configuring processing capabilities on processor 121.

It should be appreciated that although modules 124, 126, 128, 130, 132, 134, 136, and 138 are illustrated in FIG. 1 as being co-located within a single processing unit, in implementations in which processor 121 includes multiple processing units, one or more of modules 124, 126, 128, 130, 132, 134, 136, and 138 may be located remotely from the other modules. The description of the functionality provided by the different modules 124, 126, 128, 130, 132, 134, 136, and 138 described below is for illustrative purposes, and is not intended to be limiting, as any of modules 124, 126, 128, 130, 132, 134, 136, and 138 may provide more or less functionality than is described. For example, one or more of modules 124, 126, 128, 130, 132, 134, 136, and 138 may be eliminated, and some or all of its functionality may be provided by other ones of modules 124, 126, 128, 130, 132, 134, 136, and 138. As another example, processor 121 may be configured to execute one or more additional modules that may perform some or all of the functionality attributed below to one of modules 124, 126, 128, 130, 132, 134, 136, and 138.

Figure 2:
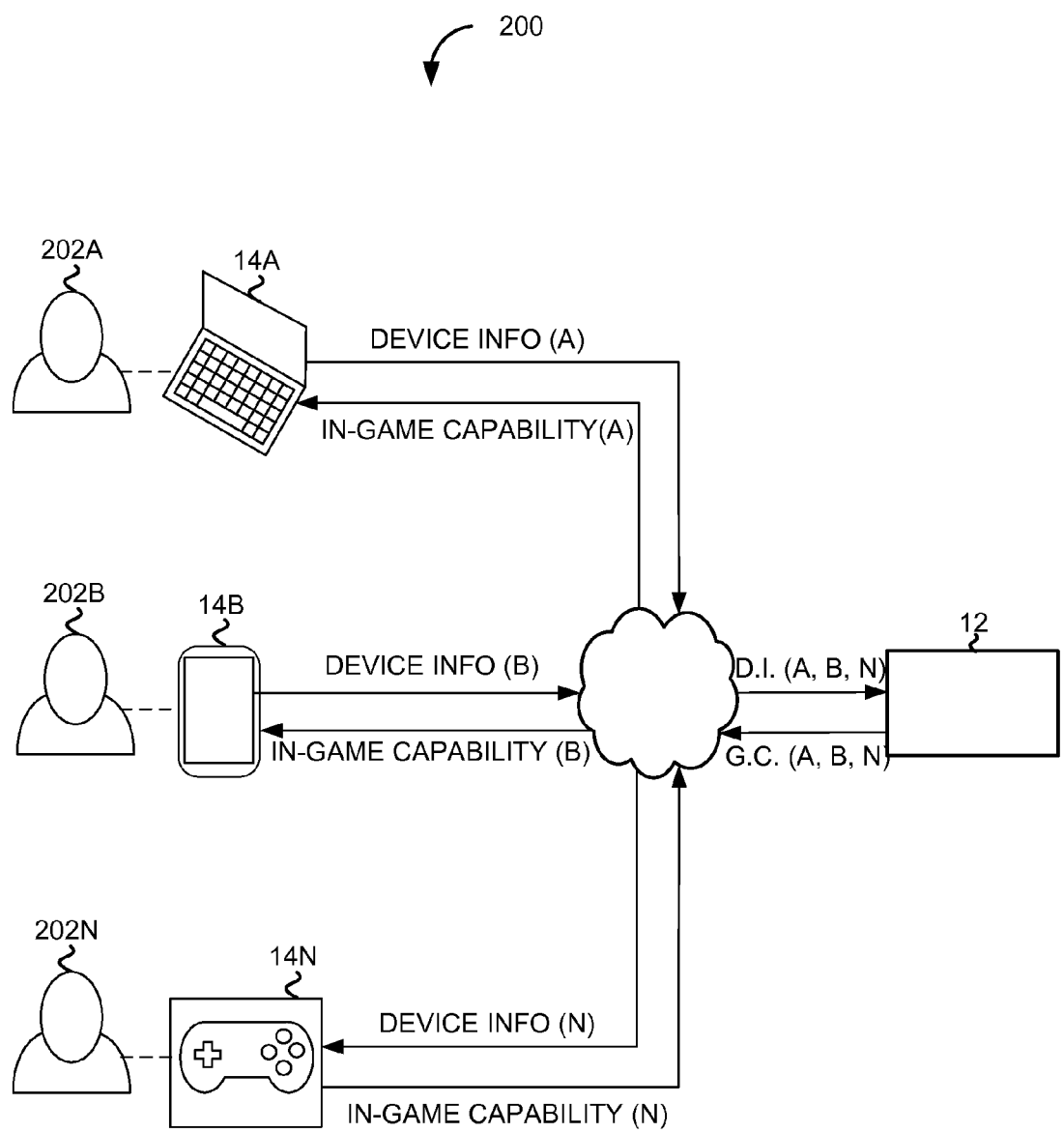
FIG. 2 illustrates a data flow diagram of providing in-game capabilities to users based on device information related to a device used to interact with the virtual space of a game, according to an aspect of the invention.

FIG. 2 illustrates a data flow diagram 200 of providing in-game capabilities to users 202 based on device information related to a client computing platform 140 used to interact with the virtual space of a game, according to an aspect of the invention. A given user 202 (illustrated in FIG. 2 as user 202A, 202B, . . . , 202N) may interact with the virtual space using a corresponding client computing platform 140 (illustrated in FIG. 2 as client computing platforms 140A, 140B, . . . , 140N). Client computing platform 140 may individually provide device information to server 120. The device information may be provided as a device indicator that identifies or otherwise indicates the client computing platform 140 (e.g., identifies the class, type, and/or other characteristic of the device), header information in data packets, and/or other information that identifies the client computing platform 140. Server 120 may obtain the device information In some embodiments, user 202 may provide a class of client computing platform 140 used to interact with the virtual space. For example, user 202 may provide the class during a logon procedure. In these embodiments, server 120 may receive the class and lookup particular, more specific information, related to the class based on the user profile. For example, the user profile may include information that identifies more than one client computing platform 140 used by the user to interact with the virtual space.

Server 120 may determine detailed device information based on the class information provided during the logon and lookup particular device information for the class of device in the user profile. For example, the user profile may include an indication that the user uses a laptop having a particular processor and display resolution, a mobile device having a particular operating system, and a particular console device. Upon logon, the user may indicate that the user is using a "laptop," which may then be used to lookup in the user profile more detailed information for the laptop device.

Upon obtaining the device information, server 120 may determine one or more corresponding in-game capabilities (illustrated in FIG. 2 as G.C. (A, B, N) for the user based on the device information. Server 120 may provide the in-game capabilities to each respective user 202 in relation to the virtual space.

Figure 3:
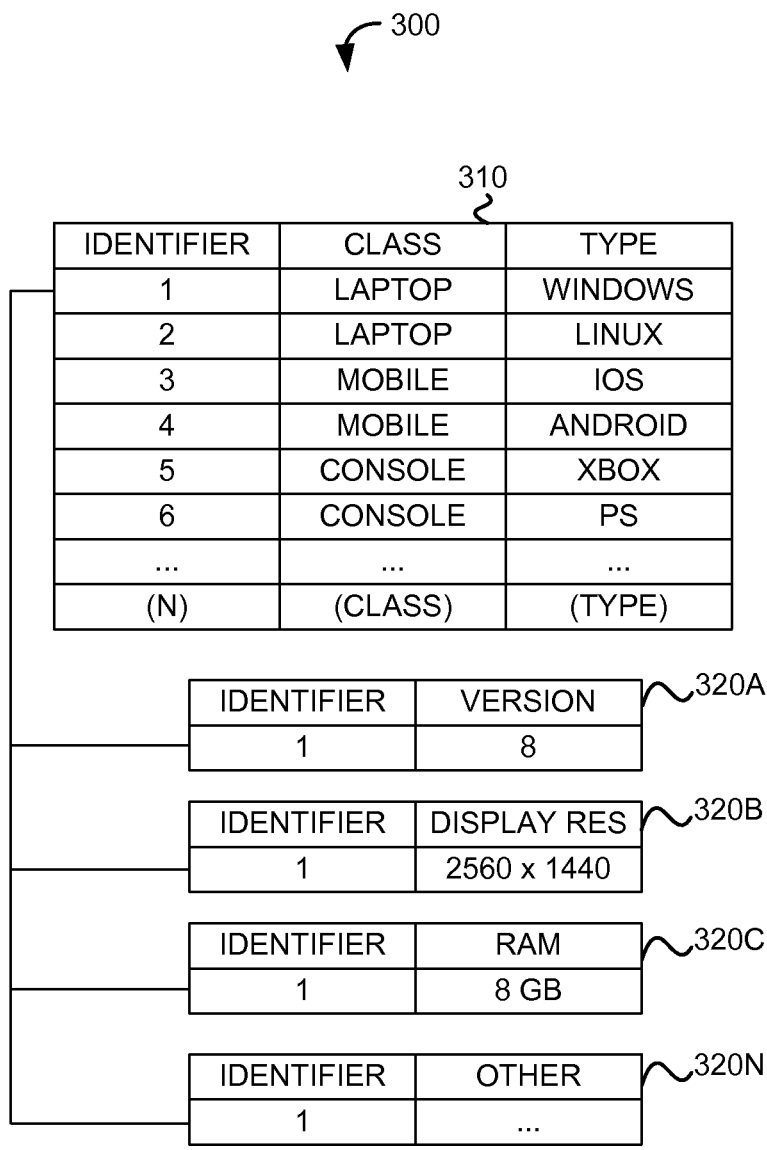
FIG. 3 illustrates an example of a data structure configured to store device information, according to an aspect of the invention.

FIG. 3 illustrates an example of a data structure 300 configured to store device information, according to an aspect of the invention. The data representations of data structure 300 and other data structures illustrated herein are for illustrative purposes only. The data structures may take different forms and may store some or all of the illustrated data values (as well as others not illustrated). Data structure 300 may be stored in electronic storage (e.g., electronic storage 122 illustrated in FIG. 1).

As illustrated, data structure 300 may store device information for various devices that may be used to interact with the virtual space. For example, data structure 300 may store various devices and their corresponding characteristics, which may indicate device capabilities. For example, a device table 310 may store an identifier (which may be auto-incremented, not an actual identifier such as a MAC address), a class of device, a type of device, and/or other information. Each device may have characteristics that are stored in characteristics tables 320 (illustrated in FIG. 3 as characteristics 320A, 320B, 320C, . . . , 320N). For example, the device indicated by identifier 1 may be a laptop running the WINDOWS operating system and have characteristics indicating that the device runs an operating system that is version 8, has a display resolution of 2560×1440, has 8 GB of RAM, and/or has other characteristics.

Data structure 300 may therefore be used to store a listing of devices and corresponding device information so that device characteristics and capabilities may be known by the system.

Figure 4:
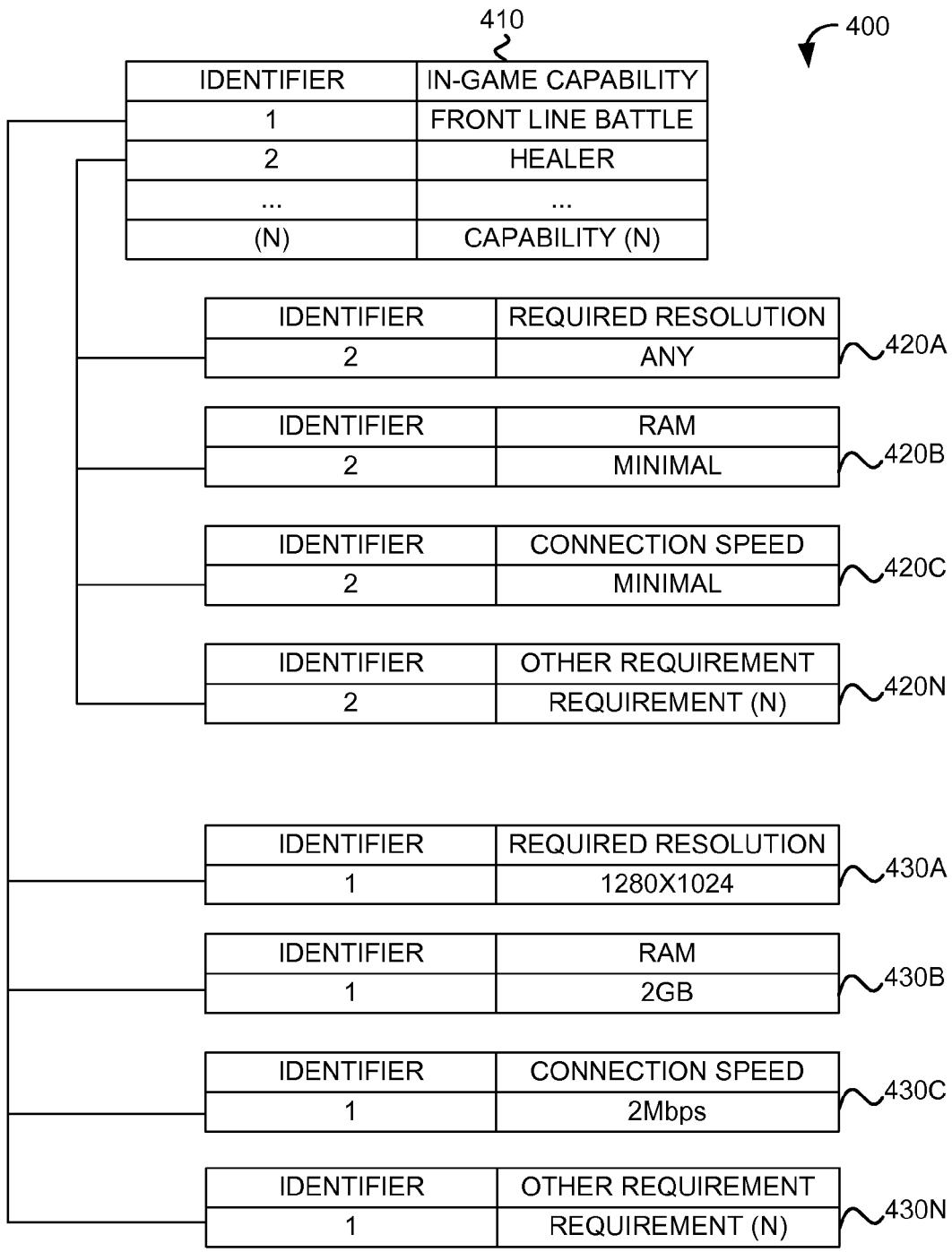
FIG. 4 illustrates an example of a data structure configured to store in-game capabilities with corresponding device requirements, according to an aspect of the invention.

FIG. 4 illustrates an example of a data structure 400 configured to store in-game capabilities with corresponding device requirements, according to an aspect of the invention. Data structure 400 may include a table 410 that stores an identifier (which may be automatically incremented) and an in-game capability. Each in-game capability may be associated with a corresponding device requirement stored in various device requirement tables (illustrated in FIG. 4 as tables 420A, 420B, 420C, 420N, 430A, 430B, 430C, 430N).

Different in-game capabilities may be associated with different device requirements. As illustrated, for example, a front line battle role may require a certain resolution, RAM, network connection speed, and/or other requirements that are different than the requirements of a healer role. The healer role may require less intensive processing/display/network bandwidth resources than the front line battle role. By storing one or more requirements of a given in-game capability, the data structure 400 (and logic/rules that use the information stored in the data structure) may be used by the system to compare device information (e.g., obtained from the user, the user device, and/or data structure 300) with the requirements the given in-game capability in order to determine whether the in-game capability is appropriate for the user of the device associated with the device information.

The data structure 400 may be used to impose minimum or other requirements for a given in-game capability, allowing for easy addition and assignment of requirements for in-game capabilities.

Figure 5:
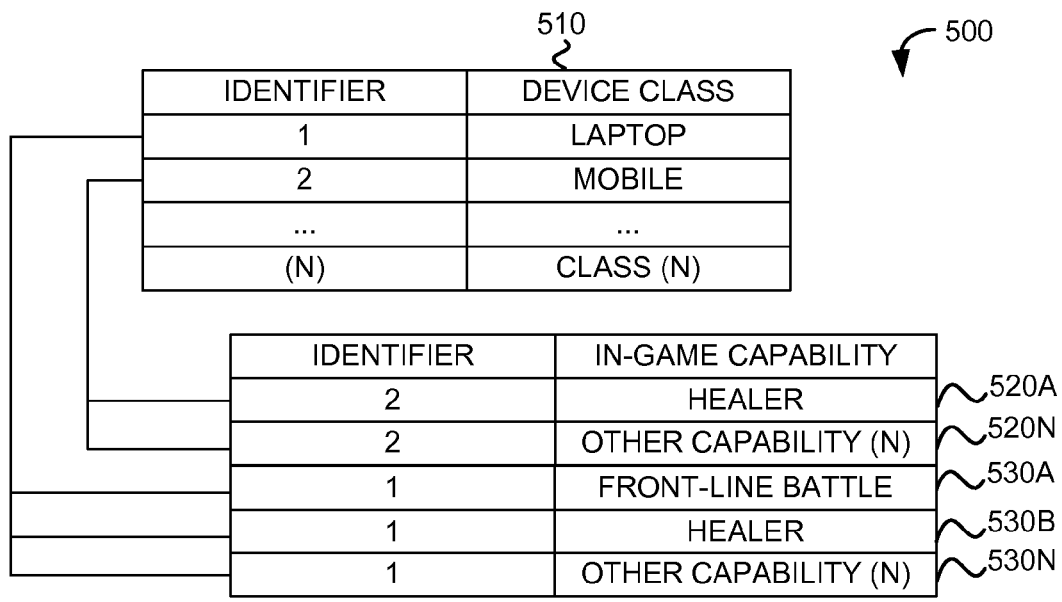
FIG. 5 illustrates an example of a data structure configured to store classes of devices and corresponding in-game capabilities, according to an aspect of the invention.

FIG. 5 illustrates an example of a data structure 500 configured to store classes of devices and corresponding in-game capabilities, according to an aspect of the invention. Data structure 400 may include a table 510 that stores an identifier (which may be automatically incremented) and a device class (and/or other device information). A given device class may be associated with one or more in-game capabilities, stored in record 520 (illustrated in FIG. 5 as record 520A, 520N, 530A, 530B, 530N). Data structure 500 may be used to store associations between a given device (or class of device) and one or more in-game capabilities. For example, a laptop device may be associated with a front-line battle role capability, a healer role capability, and/or other capability while a mobile device may be associated with less (and/or different degrees of) in-game capabilities. The data structure 500 may therefore be used to store associations of permissible in-game capabilities for given devices. As such, the data structure 500 (and logic/rules that use the information stored in the data structure) may allow for easy association between devices and permissible in-game capabilities without having to specify device requirements for the in-game capabilities. Furthermore, the data structure 500

As would be appreciated, a combination of the data structures 400 and 500 may be used to determine in-game capabilities based on the device information. To the extent that a given device is not represented in these or other data structures, default in-game capabilities may be provided by the system. Such default in-game capabilities may include none, all, or a subset of all possible in-game capabilities.

Figure 6:
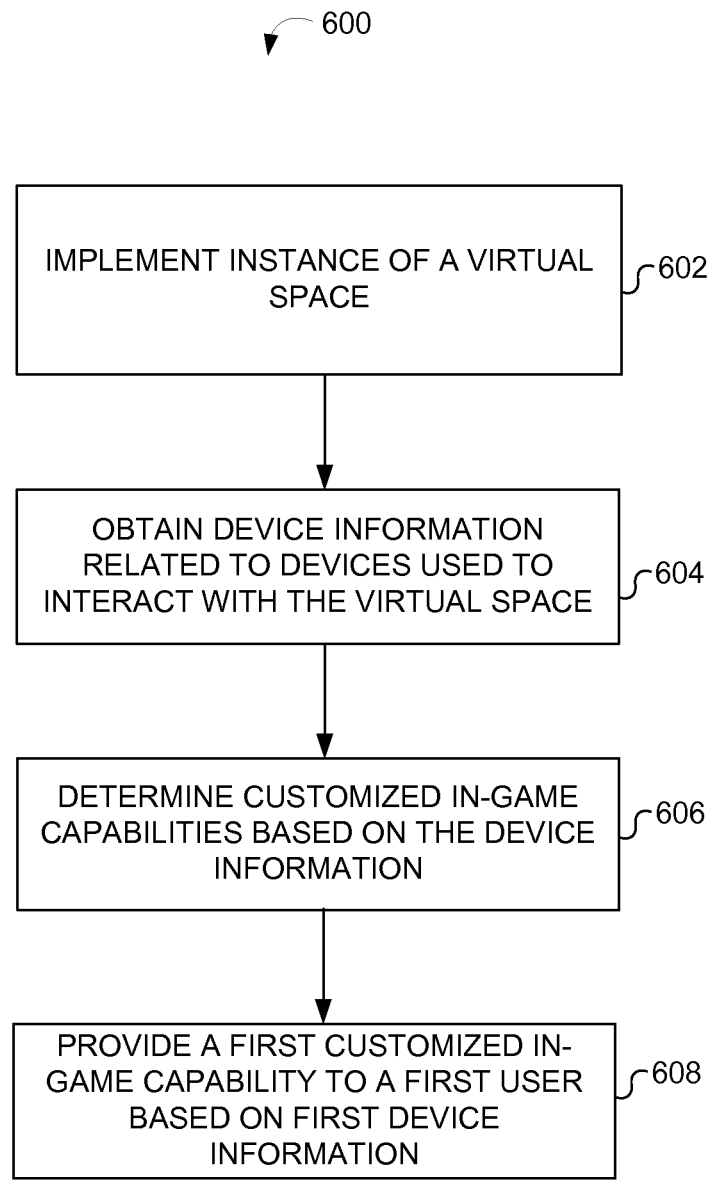
FIG. 6 illustrates an example of a process for determining in-game capabilities based on a device used to interact with the virtual space of a game, according to an aspect of the invention.

FIG. 6 illustrates an example of a process for determining in-game capabilities based on a device used to interact with the virtual space of a game, according to an aspect of the invention. The operations of process 600 and other processes described herein presented below are intended to be illustrative. In some embodiments, process 600 and other processes described herein may be accomplished with one or more additional operations not described, and/or without one or more of the operations discussed. Additionally, the order in which the operations of process 600 and other processes described herein is not intended to be limiting.

In some embodiments, process 600 and other processes described herein may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 600 and other processes described herein in response to instructions stored electronically on an electronic storage medium. The one or more processing devices may include one or more devices configured through hardware, firmware, and/or software to be specifically designed for execution of one or more of the operations of process 600 and other processes described herein.

In an operation 602, an instance of a virtual space may be implemented. In an operation 604, device information related to devices used to interact with the virtual space may be obtained. The device information may include first device information related to a device used by a first user to interact with the virtual space. The device information may be obtained from the users, the user devices, from predefined device information sources (e.g., the data structures described herein), and/or other sources of device information.

In an operation 606, customized in-game capabilities may be determined based on the device information, including a first customized in-game capability for the first user based on first device information. In an operation 608, the first customized in-game capability may be provided for use in the virtual space by the first user.

Figure 7:
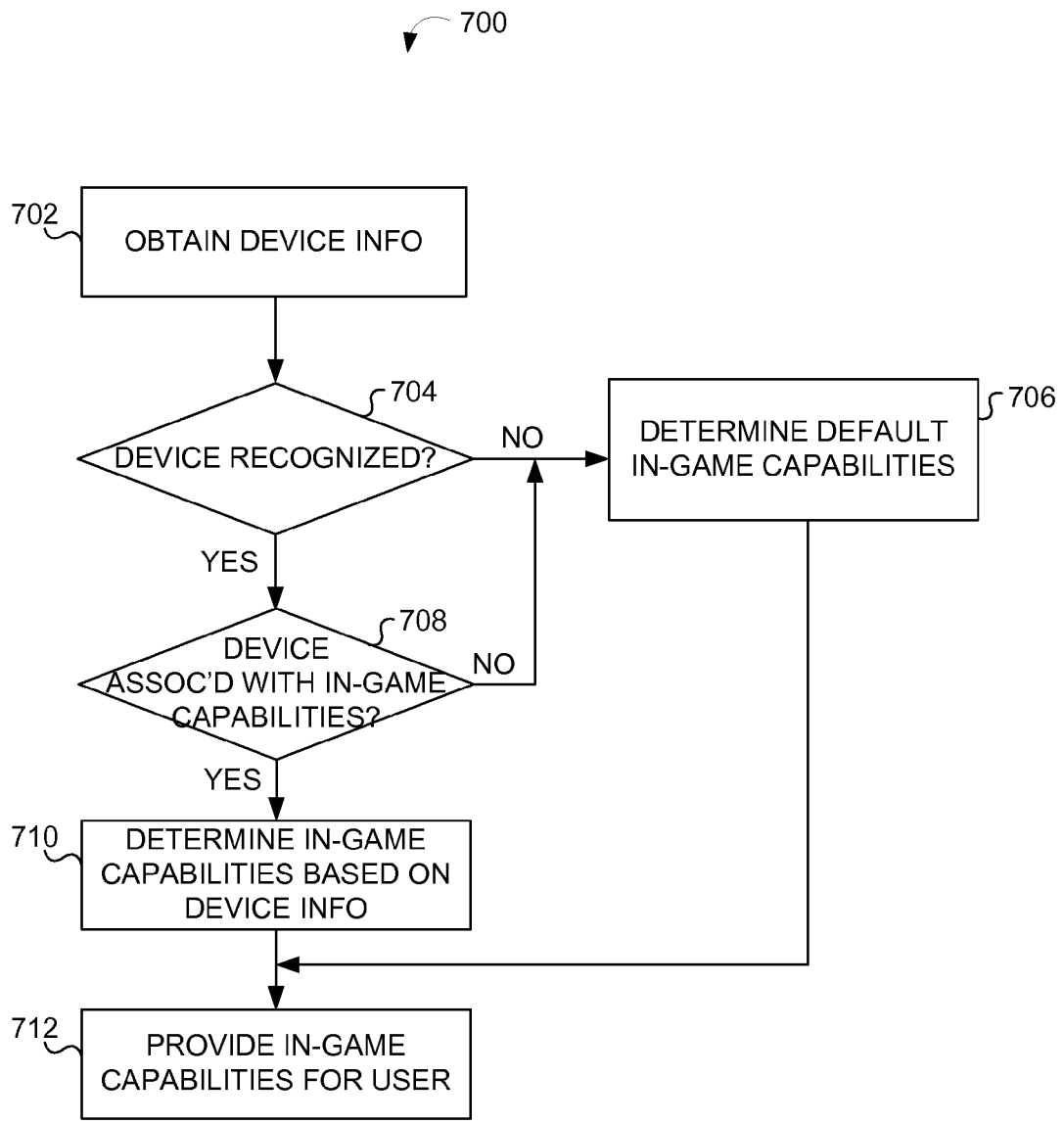
FIG. 7 illustrates an example of a process for determining in-game capabilities based on predefined associations between different devices and different in-game capabilities, according to an aspect of the invention.

FIG. 7 illustrates an example of a process 700 for determining in-game capabilities based on predefined associations between different devices and different in-game capabilities, according to an aspect of the invention. In an operation 702, device information for a user device (e.g., a client computing platform 140 illustrated in FIG. 1) may be obtained. In an operation 704, a determination of whether the device is recognized may be made. For example, predefined information (e.g., data structure 300) may be consulted to determine whether the device information is known by process 700. If the device is not recognized, default in-game capabilities may be determined in an operation 706. For example, the default in-game capabilities may include none, some, or all of the in-game capabilities that are available.

On the other hand, if the device is recognized, a determination of whether the device is associated with one or more in-game capabilities may be made in an operation 708. For example, data structure 500 may be consulted to determine whether associations between any portion of the device information and one or more in-game capabilities are predefined. If the device is not associated with in-game capabilities, then default in-game capabilities may be determined in operation 706. If the device is associated with in-game capabilities, such in-game capabilities may be determined in an operation 710. In an operation 712, the in-game capabilities may be provided to the user such that the capabilities are usable by the user in the virtual space.

Figure 8:
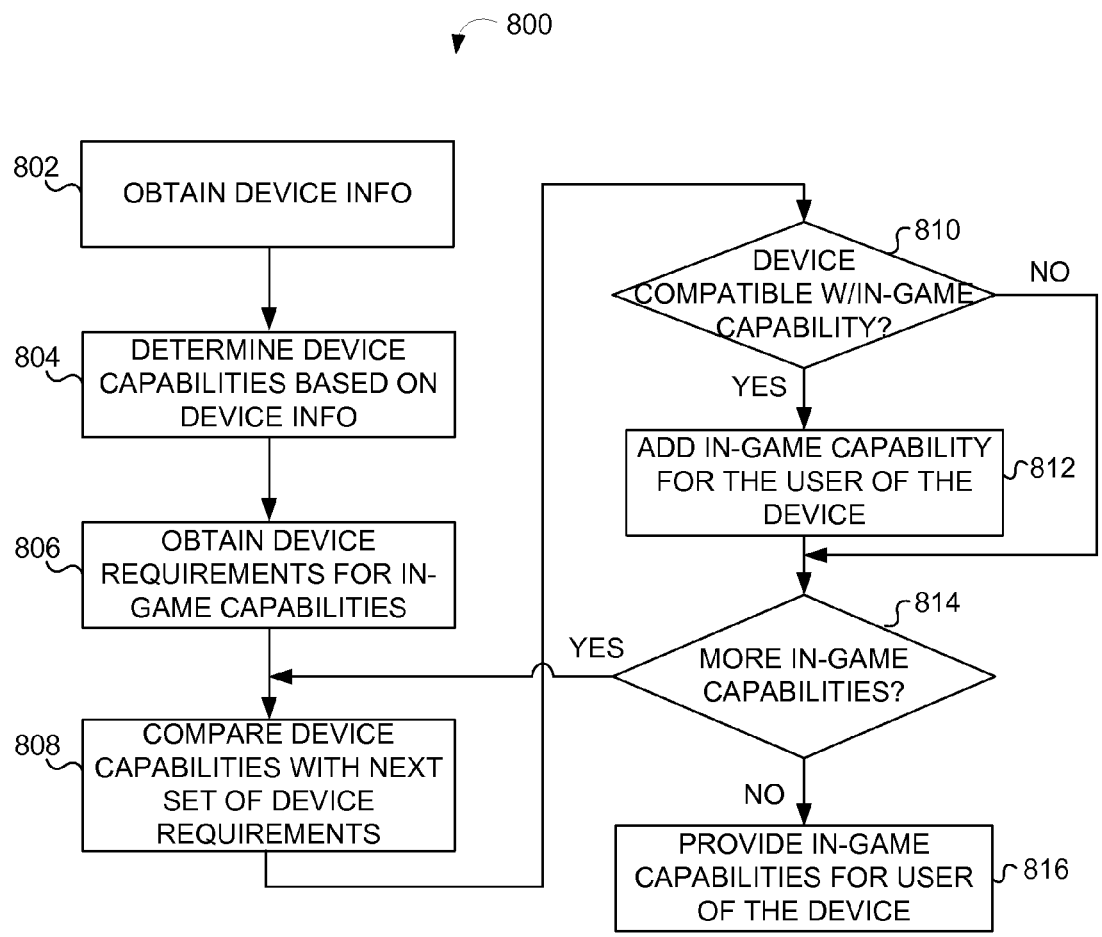
FIG. 8 illustrates an example of a process for providing in-game capabilities based on whether devices meet predefined requirements of in-game capabilities, according to an aspect of the invention.

FIG. 8 illustrates an example of a process for providing in-game capabilities based on whether devices meet predefined requirements of in-game capabilities, according to an aspect of the invention. In an operation 802, device information may be obtained. In an operation 804, device capabilities may be determined based on the device information. For example, the device capabilities may be included with the device information and/or may be looked up using predefined information (e.g., information stored in data structure 300).

In an operation 806, device requirements for in-game capabilities may be obtained. For example, the device requirements for a given in-game capability may be obtained from predefined information (e.g., information stored in data structure 400). In an operation 808, the device capabilities may be compared with the device requirements for the given in-game capability.

In an operation 810, a determination of whether the device is compatible with each in-game capability may be made based on the comparison. A user device may be compatible with a given in-game capability when the user device capabilities meet or otherwise satisfy the device requirements for the given in-game capability.

If the user device is compatible with the given in-game capability, the in-game capability may be added or otherwise provided for the user of the user device in an operation 812 such that the given in-game capability is usable by the user in the virtual space. In an operation 814, a determination of whether there exist more in-game capabilities to potentially provide may be made. If more in-game capabilities exist, process 800 may return to operation 808, where the next in-game capability may be processed. If no other in-game capabilities are to be processed, the in-game capabilities for which the user device is compatible may be provided for the user such that the user is access the in-game capabilities when interacting with the virtual space.

Although an in-game capability is described herein as having its own requirements or being associated with particular devices, two or more in-game capabilities may together have requirements such that if the requirements are not satisfied then neither of the two or more in-game capabilities will be made available for the user.

Furthermore, the predefined associations between devices and in-game capabilities may be arbitrary such that they may be configured by the developer and/or by the users (e.g., players). Additionally, in some embodiments, one or more device requirements may be a matter of scale such that if a given requirement is not satisfied, some level of in-game capability may be provided for the user based on a level of satisfaction. For example, if a given requirement has been 80% satisfied, then a fraction (e.g., 80 or other fraction) of the in-game capability may be provided for the user. Such scaled in-game capability may be relevant to in-game capabilities such as content items (e.g., where the in-game capability relates to a number of content items), roles (e.g., scaled back time in which a role may be played by the user based on the scaled requirement satisfaction), and/or other scaled in-game capability.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing customized in-game capabilities to users based on respective client computing platforms used by the users to access a game, the system comprising:
    one or more processors configured by machine-readable instructions to:
        execute an instance of an online game and to facilitate presentation of the online game to users by (i) transmitting state information derived from the instance of the online game to client computing platforms associated with users to facilitate presentation of views of the online game to the users on the client computing platforms, and (ii) providing the users with in-game capabilities in relation to the instance of the online game by receiving commands input by the users through the client computing platforms and executing in-game actions corresponding to the received commands in the instance of the online game;
        obtain device information related to the client computing platforms, wherein the device information includes a first set of device information related to a first client computing platform associated with a first user;
        determine customized in-game capabilities based on the device information, the customized in-game capabilities including a first customized in-game capability based on the first set of device information;
        wherein providing the users with the in-game capabilities in the instance of the online game includes providing the users with the customized in-game capabilities such that the first customized in-game capability is provided for use by the first user in the instance of the online game based on the first client computing platform associated with the first user used to interact with the online game, and
        wherein the customized in-game capabilities comprise user roles that are associated with an ability to perform specific in-game actions, wherein different user roles are associated with different in-game actions.

2. The system of claim 1, wherein the first set of device information is obtained from the first client computing platform associated with the first user and includes a device indicator that indicates a device class and/or a device type of the first client computing platform.

3. The system of claim 2, wherein the first customized in-game capability is determined based on a first device indicator, and wherein the one or more processors are further configured by machine-readable instructions to determine a second customized in-game capability based on a second set of device information related to a second client computing platform associated with a second user used to interact with the online game, the second set of device information comprising a second device indicator different from the first device indicator and the second customized in-game capability being different from the first customized in-game capability.

4. The system of claim 1, wherein the user roles are associated with access to in-game content.

5. The system of claim 1, wherein the one or more processors are further configured by machine-readable instructions to:
    determine user classes for the users based on the device information, the user classes comprising a first user class determined for the first user based on the first set of device information such that the first user is classified in the first user class based on the first client computing platform associated with the first user.

6. The system of claim 5, wherein the user classes are associated with respective and different in-game capabilities.

7. The system of claim 1, wherein the one or more processors are further configured by machine-readable instructions to detect a change of client computing platform, the change of client computing platform associated with a given user transitioning from use of a given client computing platform to another client computing platform.

8. The system of claim 7, wherein the one or more processors are further configured by machine-readable instructions to dynamically alter the in-game capabilities of the given user based on the detected change of client computing platform.

9. The system of claim 1, wherein the one or more processors are further configured by machine-readable instructions to:

receive from users assignments of in-game capabilities for the users; and prevent assignment of at least one in-game capability to the first user based on the first set of device information.

10. The system of claim 9, wherein the one or more processors are further configured by machine-readable instructions to:

present a set of in-game capabilities that are assignable to the first user based on the first set of device information.

11. A method for providing customized in-game capabilities to users based on respective client computing platforms used by the users to access a game, the method being implemented by one or more processors configured by machine-readable instructions, the method comprising:

executing, by the one or more processors, an instance of an online game and facilitating presentation of the online game to users by (i) transmitting state information derived from the instance of the online game to client computing platforms associated with users to facilitate presentation of views of the online game to users on the client computing platforms, and (ii) providing the users with in-game capabilities in the instance of the online game by receiving commands input by the users through the client computing platforms and executing in-game actions corresponding to the received commands in the instance of the online game;

obtaining, by the one or more processors, device information related to the client computing platforms, wherein the device information includes a first set of device information related to a first client computing platform associated with a first user;

determining, by the one or more processors, customized in-game capabilities based on the device information, the customized in-game capabilities including a first customized in-game capability based on the first set of device information;

implementing, by the one or more processors, the customized in-game capabilities for the users such that the first customized in-game capability is provided for use by the first user in the instance of the online game based on the first client computing platform associated with the first user used to interact with the online game, and wherein the customized in-game capabilities comprise user roles that are associated with an ability to perform specific in-game actions, wherein different user roles are associated with different in-game actions.

12. The method of claim 11, wherein the first set of device information is obtained from the first client computing platform associated with the first user and includes a device indicator that indicates a device class and/or a device type of the first client computing platform.

13. The method of claim 12, wherein the first customized in-game capability is determined based on a first device indicator, and wherein a second customized in-game capability is determined based on a second set of device information related to a second client computing platform associated with a second user used to interact with the online game, the second set of device information comprising a second device indicator different from the first device indicator and the second customized in-game capability being different from the first customized in-game capability.

14. The method of claim 11, wherein the user roles are associated with access to in-game content.

15. The method of claim 11, the method further comprising:

determining, by the one or more processors, user classes for the users based on the device information, the user classes comprising a first user class determined for the first user based on the first set of device information such that the first user is classified in the first user class based on the first client computing platform associated with the first user.

16. The method of claim 15, wherein the user classes are associated with respective and different in-game capabilities.

17. The method of claim 11, the method further comprising:

detecting, by the one or more processors, a change of client computing platform, the change of client computing platform associated with a given user transitioning from use of a given client computing platform to another client computing platform.

18. The method of claim 17, the method further comprising:

dynamically altering, by the one or more processors, the in-game capabilities of the given user based on the detected change of client computing platform.

19. The method of claim 11, the method further comprising:

receiving, by the one or more processors, from users assignments of in-game capabilities for the users; and preventing, by the one or more processors, assignment of at least one in-game capability to the first user based on the first set of device information.

20. The method of claim 19, the method further comprising:

presenting, by the one or more processors, a set of in-game capabilities that are assignable to the first user based on the first set of device information.

* * * * *